United States Patent
Kanbe et al.

(10) Patent No.: US 9,891,601 B2
(45) Date of Patent: Feb. 13, 2018

(54) PROCESS CONTROL DEVICE, PROCESS CONTROL SYSTEM, AND PROCESS CONTROL METHOD

(71) Applicant: YOKOGAWA ELECTRIC CORPORATION, Musashino-shi, Tokyo (JP)

(72) Inventors: Takahiro Kanbe, Tokyo (JP); Mitsuhiro Yamamoto, Tokyo (JP)

(73) Assignee: YOKOGAWA ELECTRIC CORPORATION, Musashino-shi (JP)

( * ) Notice: Subject to any disclaimer, the term of this patent is extended or adjusted under 35 U.S.C. 154(b) by 482 days.

(21) Appl. No.: 13/930,697

(22) Filed: Jun. 28, 2013

(65) Prior Publication Data

US 2014/0012398 A1    Jan. 9, 2014

(30) Foreign Application Priority Data

Jul. 3, 2012  (JP) ................ 2012-149352

(51) Int. Cl.
| | |
|---|---|
| *G05B 15/02* | (2006.01) |
| *G05B 19/042* | (2006.01) |
| *G06F 9/455* | (2006.01) |

(52) U.S. Cl.
CPC ........... *G05B 15/02* (2013.01); *G05B 19/042* (2013.01); *G06F 9/45533* (2013.01)

(58) Field of Classification Search
CPC .. G05B 15/02; G05B 19/042; G05B 19/4185; G05B 19/4186
USPC ......................................... 700/2
See application file for complete search history.

(56) References Cited

U.S. PATENT DOCUMENTS

| | | | | |
|---|---|---|---|---|
| 5,761,518 A | * | 6/1998 | Boehling | ........... G05B 19/0421 700/82 |
| 6,901,583 B1 | * | 5/2005 | Park | ................. G06F 11/3688 703/26 |
| 2007/0078980 A1 | | 4/2007 | Tomita et al. | |
| 2009/0132057 A1 | * | 5/2009 | Kettu | ................. B25J 9/161 700/5 |

(Continued)

FOREIGN PATENT DOCUMENTS

| | | | |
|---|---|---|---|
| DE | 102010010890 A1 * | 9/2011 | ......... G05B 19/0428 |
| JP | 2003-316433 A | 11/2003 | |

(Continued)

*Primary Examiner* — Jason Lin
(74) *Attorney, Agent, or Firm* — Westerman, Hattori, Daniels & Adrian, LLP

(57) ABSTRACT

A process control device according to one aspect of the present invention is configured to control an industrial process implemented in a plant. The process control device includes: a virtualizer configured to run over a hardware in lieu of the hardware; and first and second controllers configured to run over the virtualizer and control operations of a plurality of field apparatuses configured to perform at least one of measurement and operation which are required to control the industrial process; an input distributor included in the virtualizer, the input distributor being configured to distribute a signal output from the field apparatus to the first and second controllers; and an output acquirer included in the virtualizer, and the output acquirer being configured to acquire outputs of the first and second controllers, and output any one of the outputs to at least one of the field apparatuses.

4 Claims, 8 Drawing Sheets

(56) References Cited

U.S. PATENT DOCUMENTS

| | | | |
|---|---|---|---|
| 2009/0178033 A1* | 7/2009 | Challener | G06F 9/4411 717/168 |
| 2009/0319060 A1* | 12/2009 | Wojsznis | G05B 11/42 700/30 |
| 2012/0046764 A1* | 2/2012 | Aneweer | G05B 23/0237 700/79 |
| 2012/0104295 A1 | 5/2012 | Do et al. | |
| 2013/0218306 A1* | 8/2013 | Polzer | G05B 19/0428 700/79 |

FOREIGN PATENT DOCUMENTS

| | | |
|---|---|---|
| JP | 2005-267297 A | 9/2005 |
| JP | 4399773 B2 | 1/2010 |
| WO | 2005/050336 A1 | 6/2005 |
| WO | 2012-047654 A1 | 4/2012 |

* cited by examiner

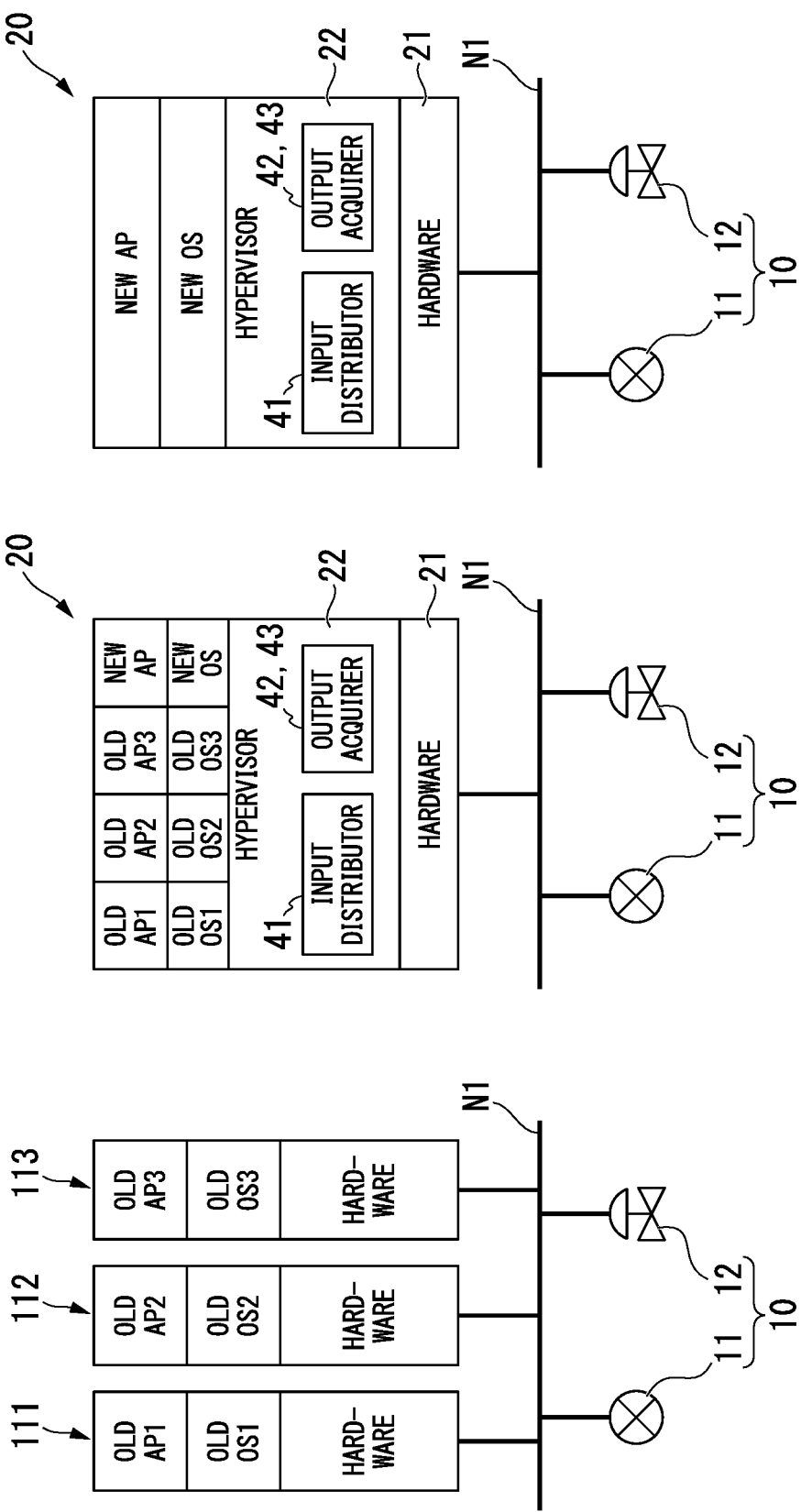

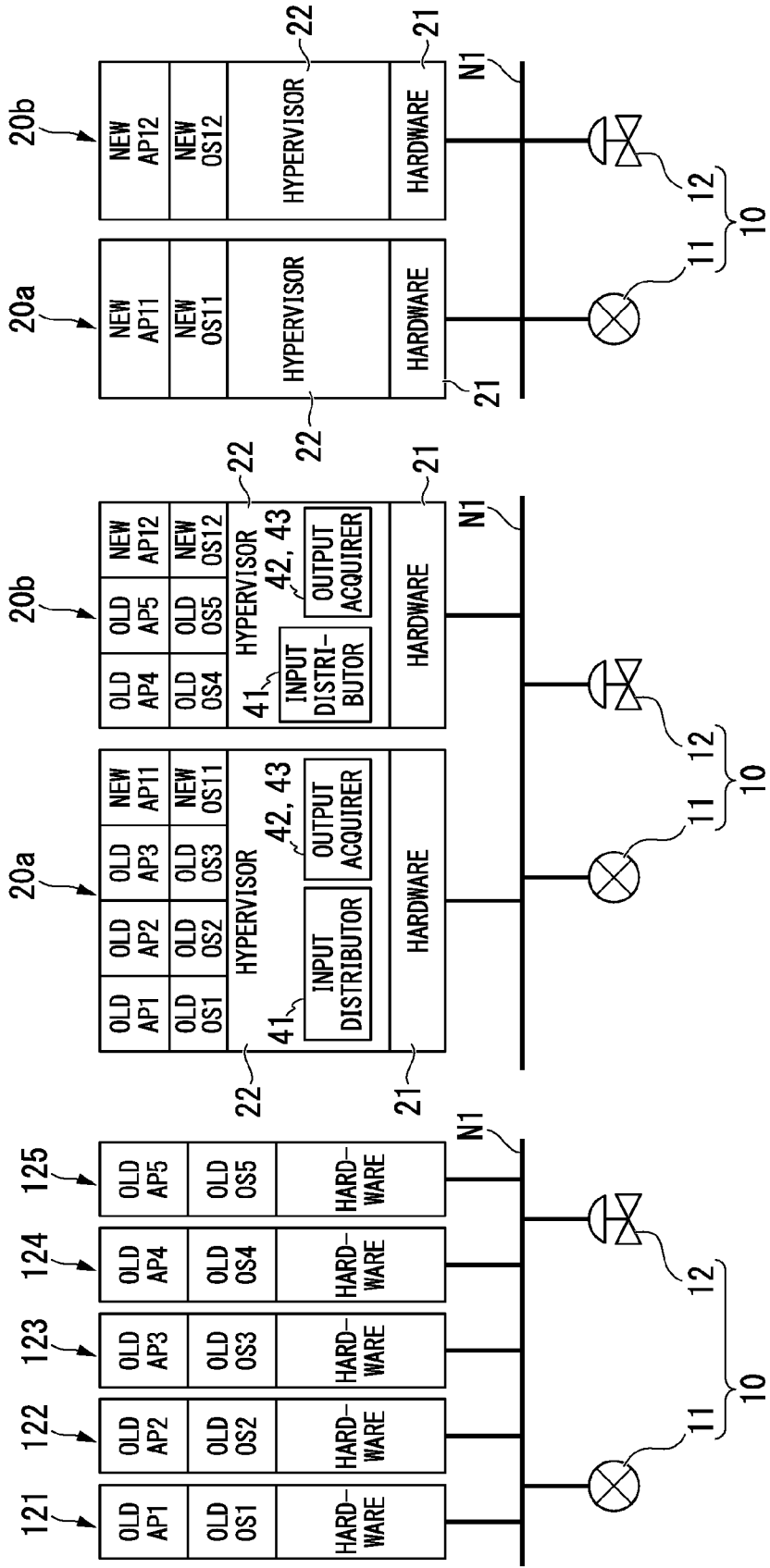

PROCESS CONTROL DEVICE, PROCESS CONTROL SYSTEM, AND PROCESS CONTROL METHOD

BACKGROUND OF THE INVENTION

Field of the Invention

The present invention relates to a process control device, a process control system, and a process control method.

Priority is claimed on Japanese Patent Application No. 2012-149352, filed Jul. 3, 2012, the content of which is incorporated herein by reference.

Description of the Related Art

Conventionally, process control systems that control various quantities of states (such as the pressure, the temperature, the flow amount, or the like) for industrial processes performed in plants have been established, and sophisticated automatic operations have been implemented. As shown in, for example, FIG. 7 of Japanese Patent No. 4399773 (hereinafter, "Patent Document 1"), FIG. 1 of International Publication No. 2005/050336 (hereinafter, "Patent Document 2"), and FIG. 1 of United States Patent Application Publication No. US 2007/0078980 (hereinafter, "Patent Document 3"), process control systems of the related art have a configuration such that multiple sensors such as a flowmeter and a thermometer, and an actuator are coupled directly to a controller. The controller controls the actuator in accordance with results of the detection by the sensors, thereby controlling the above various quantities of states.

Here, plants are often designed to have an approximately 30-year lifetime. On the other hand, various devices constituting a process control system (such as the above controller, the sensors, and the actuator) are constituted of versatile electronic components in many cases. For this reason, the lifetimes of the devices depend on the lifetimes of the electronic components, and are therefore approximately 10 years. A sensor alone can be exchanged when the lifetime thereof expires. However, versatile electronic components are mounted on an I/O card that is an interface of the controller, thereby limiting the lifetime of the controller to approximately 10 years, and also limiting the lifetime of the process control system.

Thus, various devices constituting the process control system have shorter lifetimes than the plant. Therefore, it is necessary to replace the process control system before the lifetime of the plant expires. For this reason, as shown in FIG. 1 of Patent Document 1, FIG. 2 of Patent Document 2, and FIG. 2 of Patent Document 3, it is conceivable to make a configuration such that various devices constituting a process control system are connected to the same network, and the above I/O card is removed, thereby extending the lifetime of the process control system.

Regarding various devices constituting a process control system, versatile electronic components are used for other parts than the I/O card of the controller. Additionally, recently, an allowable period for providing software used for the process control system, such as operating systems (OS) and application programs, has been becoming shorter to approximately 5 to 10 years. For this reason, as explained above, even if the lifetime of the process control system is extended as a result of removing the I/O card, it is eventually necessary to replace the process control system from the view points of both software and hardware.

Further, recently, there has been increasing demands for not only mainlining the functions of process control systems, but also aggressively enhancing the functions thereof, for various purposes (such as to save energy, to comply with environmental regulations, or to enhance the production efficiency). To meet such demands, it is necessary to replace the process control system already established in a plant with a new process control system before the lifetime of the plant expires.

Here, when a process control system is replaced, it is preferable to employ a reliable and safe replacement procedure such that controllability before and after the replacement is ensured, and thereafter enhancement of the existing functions or installment of new functions is performed. For this reason, it is necessary to ensure that the controllability of the process control system before the replacement is maintained even after the replacement. For this reason, when a process control system is replaced, it is necessary to make sufficient evaluation of the controllability of the process control system after the replacement, thereby requiring a long time and a large cost for the evaluation.

Regarding the replacement of the process control system, it is conceivable to temporarily make the existing system and the new system co-exist to evaluate the controllability of each system, and remove the existing system after the evaluation, thereby reducing the evaluating time. In the case where the existing and new systems co-exist, however, it is necessary to manage various devices used for each system (such as controllers) by different tag names, thereby causing difficulty with operation after the removal of the existing system.

SUMMARY

A process control device according to one aspect of the present invention is configured to control an industrial process implemented in a plant. The process control device includes: a virtualizer configured to run over a hardware in lieu of the hardware; and first and second controllers configured to run over the virtualizer and control operations of a plurality of field apparatuses configured to perform at least one of measurement and operation which are required to control the industrial process; an input distributor included in the virtualizer, the input distributor being configured to distribute a signal output from the field apparatus to the first and second controllers; and an output acquirer included in the virtualizer, and the output acquirer being configured to acquire outputs of the first and second controllers, and output any one of the outputs to at least one of the field apparatuses.

A process control system according to another aspect of the present invention is configured to control an industrial process implemented in a plant, the process control system includes: a network provided in the plant; a plurality of field apparatuses connected to the network, the plurality of field apparatuses being configured to perform at least one of measurement and operation which are required to control the industrial process; and a process control device connected to the network. The process control device includes: a virtualizer configured to run over a hardware in lieu of the hardware; and first and second controllers configured to run over the virtualizer and control operations of the field apparatuses; an input distributor included in the virtualizer, the input distributor being configured to distribute a signal output from the field apparatus to the first and second controllers; and an output acquirer included in the virtualizer, and the output acquirer being configured to acquire outputs of the first and second controllers, and output any one of the outputs to at least one of the field apparatuses.

A process control method for a first process control device according to another aspect of the present invention includes: acquiring first data measured by a first field apparatus of a plurality of field apparatuses; distributing the first data to first and second controllers included in the first process control device; acquiring from the first and second controllers, first and second signals for controlling the field apparatuses, which are generated by the first and second controllers based on the first data; and outputting at least one of the first and second signals to a second field apparatus of the field apparatuses.

BRIEF DESCRIPTION OF THE DRAWINGS

The above features and advantages of the present invention will be more apparent from the following description of certain preferred embodiments taken in conjunction with the accompanying drawings.

FIGS. 7A to 7C are diagrams illustrating first application of the process control systems of the first and second embodiments of the present invention.

FIGS. 8A to 8C are diagrams illustrating second application of the process control systems of the first and second embodiments of the present invention.

DETAILED DESCRIPTION OF THE PREFERRED EMBODIMENTS

The present invention will now be described herein with reference to illustrative embodiments. The accompanying drawings explain process control systems in the embodiments. The size, the thickness, and the like of each illustrated portion might be different from those of each portion of an actual process control system.

Those skilled in the art will recognize that many alternative embodiments can be accomplished using the teachings of the present invention and that the present invention is not limited to the embodiments illustrated herein for explanatory purposes.

Hereinafter, process control systems according to embodiments of the present invention are explained in detail with reference to drawings.

(First Embodiment)

Figure 1:
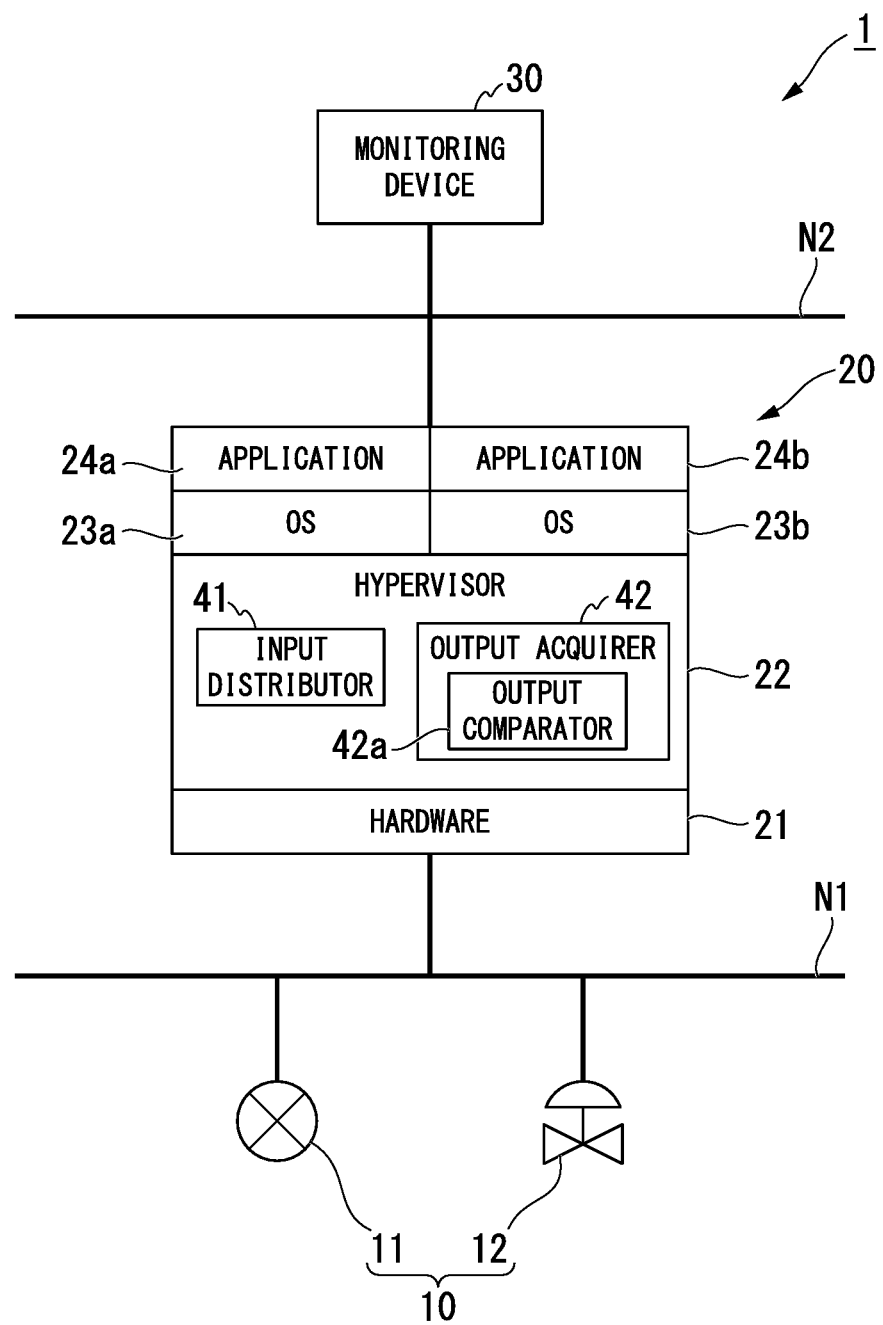
FIG. 1 is a block diagram illustrating a primary part of a process control system according to a first embodiment of the present invention.

FIG. 1 is a block diagram illustrating a process control system according to a first embodiment of the present invention. As shown in FIG. 1, a process control system 1 of the first embodiment includes: a field apparatus 10; a controller 20 (process control device); and a monitoring device 30. The controller 20 controls the field apparatus 10 while being monitored by the monitoring device 30, thereby controlling an industrial process implemented in a plant (not shown).

Here, the field apparatus 10 and the controller 20 are connected to a field network N1, and the controller 20 and the monitoring device 30 are connected to a control network N2. The field network N1 is a wired network provided in a site of the plant. On the other hand, the control network N2 is a wired network connecting the site of the plant and the monitoring room. Here, the field network N1 and the control network N2 may be wireless networks.

The field apparatus 10 includes, for example, a sensor apparatus such as a flowmeter and a thermometer, a valve apparatus such as a flow amount control valve and an on-off valve, an actuator apparatus such as a fan and a motor, and other apparatuses provided in the site of the plant. Here, for easy understanding, a sensor apparatus 11 (first field apparatus) and a valve apparatus 12 (second field apparatus), which are included in the field apparatus 10 provided in the plant, are shown in FIG. 1. The sensor apparatus 11 measures the amount of flow of a fluid. The valve apparatus 12 controls the amount of flow of the fluid.

The field apparatus 10 operates in accordance with control data transmitted from the controller 20 via the field network N1. For example, in a case where a request for transmitting measurement data (data indicating a result of measurement of the amount of flow of the fluid) is transmitted from the controller 20 to the sensor apparatus 11, the sensor apparatus 11 transmits the measurement data to the controller 20 via the field network N1. Additionally, in a case where control data (data that controls the degree of opening of the valve) is transmitted from the controller 20 to the valve, the valve apparatus 12 sets the degree of opening of the valve through which the fluid passes, in accordance with the instruction given by the control data.

The controller 20 collects measurement data from the field apparatus 10 (such as the sensor apparatus 11) while being monitored by the monitoring device 30, and controls the field apparatus 10 (such as the valve apparatus 12) based on the collected measurement data. Here, the function of the controller 20 is implemented by a computer reading software and thus software and hardware resources cooperating.

Specifically, the function of the controller 20 is implemented by a hardware 21, which includes an MPU (microprocessing unit), a memory, and the like, executing an installed program. Here, a program for implementing a hypervisor 22 (virtualizer); a program for implementing an operating system (OS) 23a (first controller); a program for implementing an operating system 23b (second controller); a program for implementing an application 24a (first controller); and a program for implementing an application 24b (second controller) have been installed in the controller 20.

The above hypervisor 22 virtually runs over the hardware 21 in lieu of the hardware. The hypervisor 22 is provided for the purpose of replacing the hardware 21 without changing the operating systems 23a and 23b, and the applications 24 a and 24b. Additionally, the hypervisor 22 is provided for another purpose of causing the operating system 23a and the application 24a to run independently from the operating system 23b and the application 24b.

In other words, even when the hardware 21 is replaced with a hardware having a MPU architecture, the memory size, the cache size, a memory map, a device interface, and the like, which differ from those of the replaced hardware 21, the hypervisor 22 provides to the operating systems 23a and 23b, a similar interface to that before the replacement. Thus, the operating systems 23a and 23b, which run over the hypervisor 22, are not affected by the replacement of the hardware 21. Therefore, the same operating systems 23a and 23b and the same applications 24a and 24b as used before the replacement can run over the new hardware 21.

Additionally, by the provision of the hypervisor 22, the operating systems 23a and 23b, and the applications 24a and 24b can run as follows.

Only the operating system 23a and the application 24a run

Only the operating system 23b and the application 24b run

The operating system 23a and the application 24a run independently from the operating system 23b and the application 24b As shown in FIG. 1, the hypervisor 22 includes an input distributor 41 (distributor) and an output acquirer 42 (acquirer). The input distributor 41 distributes measurement data and status data (first data) collected from the field apparatus 10 (such as the sensor apparatus 11) to the applications 24a and 24b via the operating systems 23a and 23b, respectively. The output acquirer 42 acquires two control data (first and second signals) respectively output from the applications 24a and 24b via the operating systems 23a and 23b. Then, the output acquirer 42 outputs any one of the two acquired control data (here, the control data output from the application 24a) to the field apparatus 10 (such as the valve apparatus 12). Then, the field apparatus 10 (such as the valve apparatus 12) is controlled based on the output control data. Here, the output acquirer 42 includes an output comparator 42a that compares the two acquired control data (two control data respectively output from the applications 24a and 24b). As will be explained in detail later, the reason that the input distributor 41 and the output acquirer 42 are provided in the hypervisor 22 is to make it easy to evaluate controllability at the time of replacing the existing system with a new system.

The operating systems 23a and 23b independently run over the hypervisor 22. For example, the operating systems 23a and 23b perform various managements, such as a process management and a memory management, which are required to cause the applications 24a and 24b to run. The applications 24a and 24b independently run over the operating systems 23a and 23b, respectively. The applications 24a and 24b perform control of the field apparatus 10, which is required for controlling a process (such as collection of measurement data or the like from the sensor apparatus 11, transmission of control data to the valve apparatus 12, and the like).

The monitoring device 30 is implemented by, for example, a computer. The monitoring device 30 is operated by an operator and used for monitoring a process. Specifically, the monitoring device 30 monitors or manages operating states of the operating systems 23a and 23b, and the applications 24a and 24b, which run in the controller 20. Then, the monitoring device 30 controls the controller 20 in accordance with a result of the monitoring (or in accordance with operational instructions from the operator).

Figure 2A:
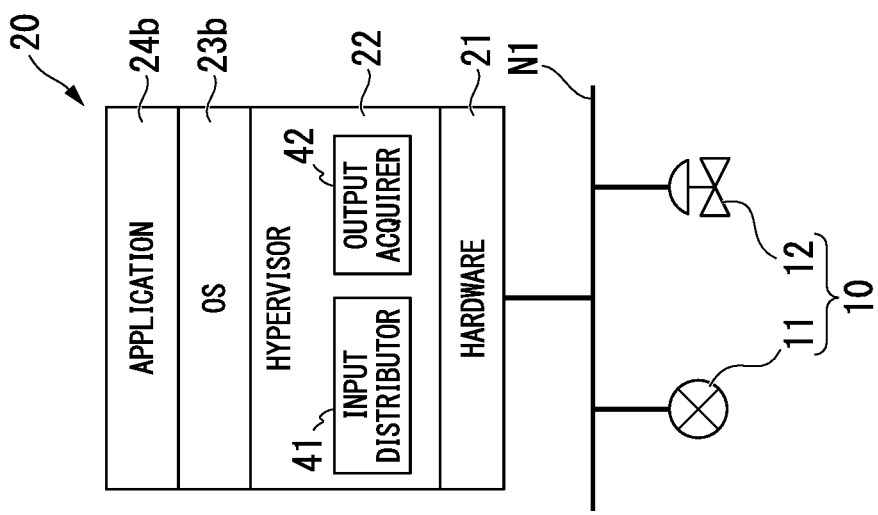
FIGS. 2A to 2C are diagrams schematically illustrating a procedure of replacing a controller according to the first embodiment of the present invention.
Figure 2B:
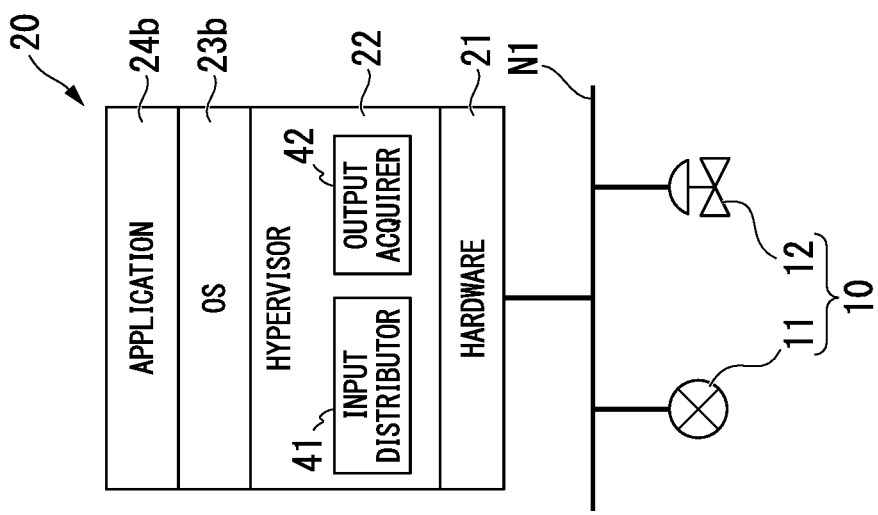
Figure 2C:
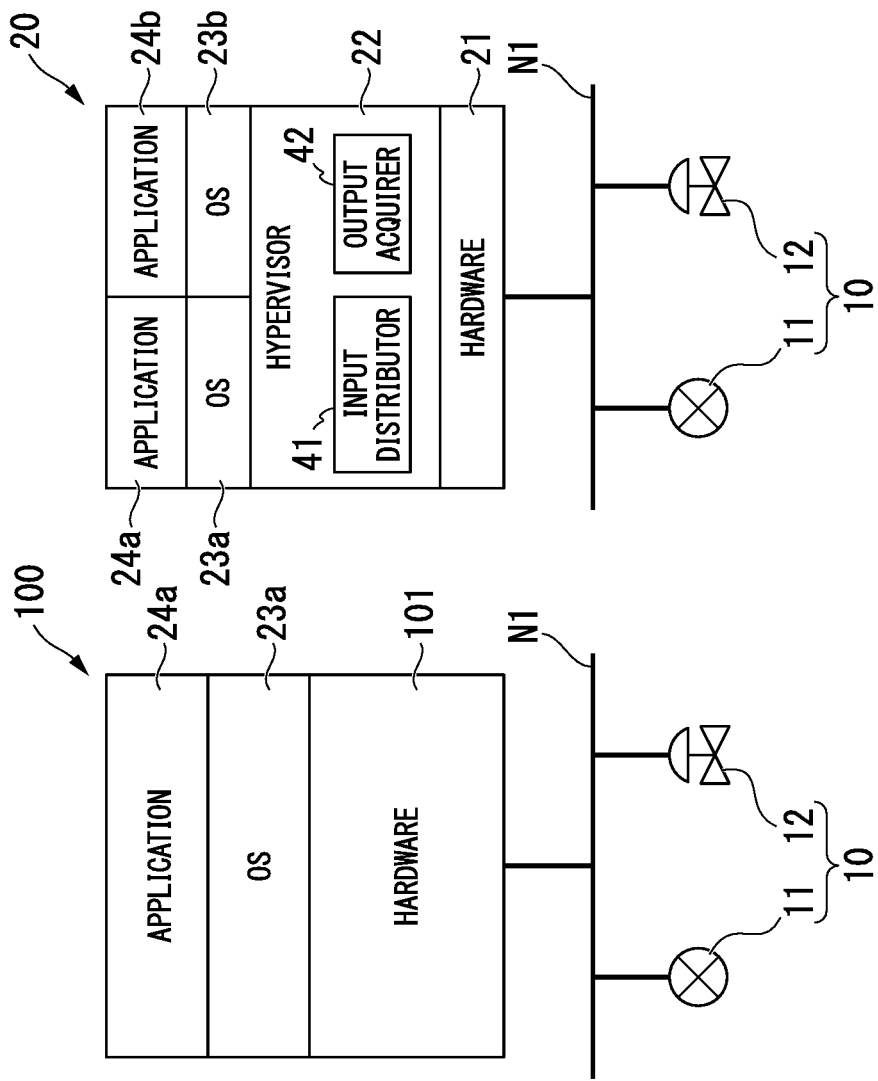

Next, a procedure of replacing the controller provided in the process control system 1 having the above configuration is explained. Here, replacement of the controller is performed in a case where the processing performance of the controller is enhanced, in a case where an additional function is added to the controller, or the like. FIGS. 2A to 2C are diagrams schematically illustrating the procedure of replacing the controller according to the first embodiment of the present invention. Here, the monitoring device 30 and the control network N2 shown in FIG. 1 are omitted in FIGS. 2A to 2C.

It is assumed here that the aforementioned operating systems 23a and the application 24a are software (first software) used by an existing controller before the replacement (the controller 100 shown in FIG. 2A; a second process control device). Conversely, the aforementioned operating systems 23b and the application 24b are software (second software) to be used by a new controller after the replacement (the controller 20 shown in FIGS. 1, 2B, and 2C; a first process control device).

When the operation of replacing the controller is initiated, first, an operator at a site specifies a controller to be replaced. It is assumed here that the controller 100 shown in FIG. 2A is specified as the controller to be replaced. The controller 100 is a controller in which the operating system 23a and the application 24a run over the hardware 101.

Then, the operator removes the specified existing controller 100 from the field network N1, and connects a new controller 20 to the field network N1. The controller 20 is a controller in which a program for implementing the hypervisor 22, programs for implementing the operating systems 23a and 23b, and programs for implementing the applications 24a and 24b have been installed.

When the operator turns on the controller 20 after the above work, the installed programs run, and thus the hypervisor 22, the operating systems 23a and 23b, and the applications 24a and 24b run as shown in FIG. 2B. Thus, the controller 20 enters a state in which the first software executed by the existing controller 100 (the operating system 23a and the application 24a) is installed in the first controller, and the second software (the operating system 23b and the application 24b) that is newer in version than the first software is installed in the second controller, and the first and second controllers are independently executed.

Figure 3:
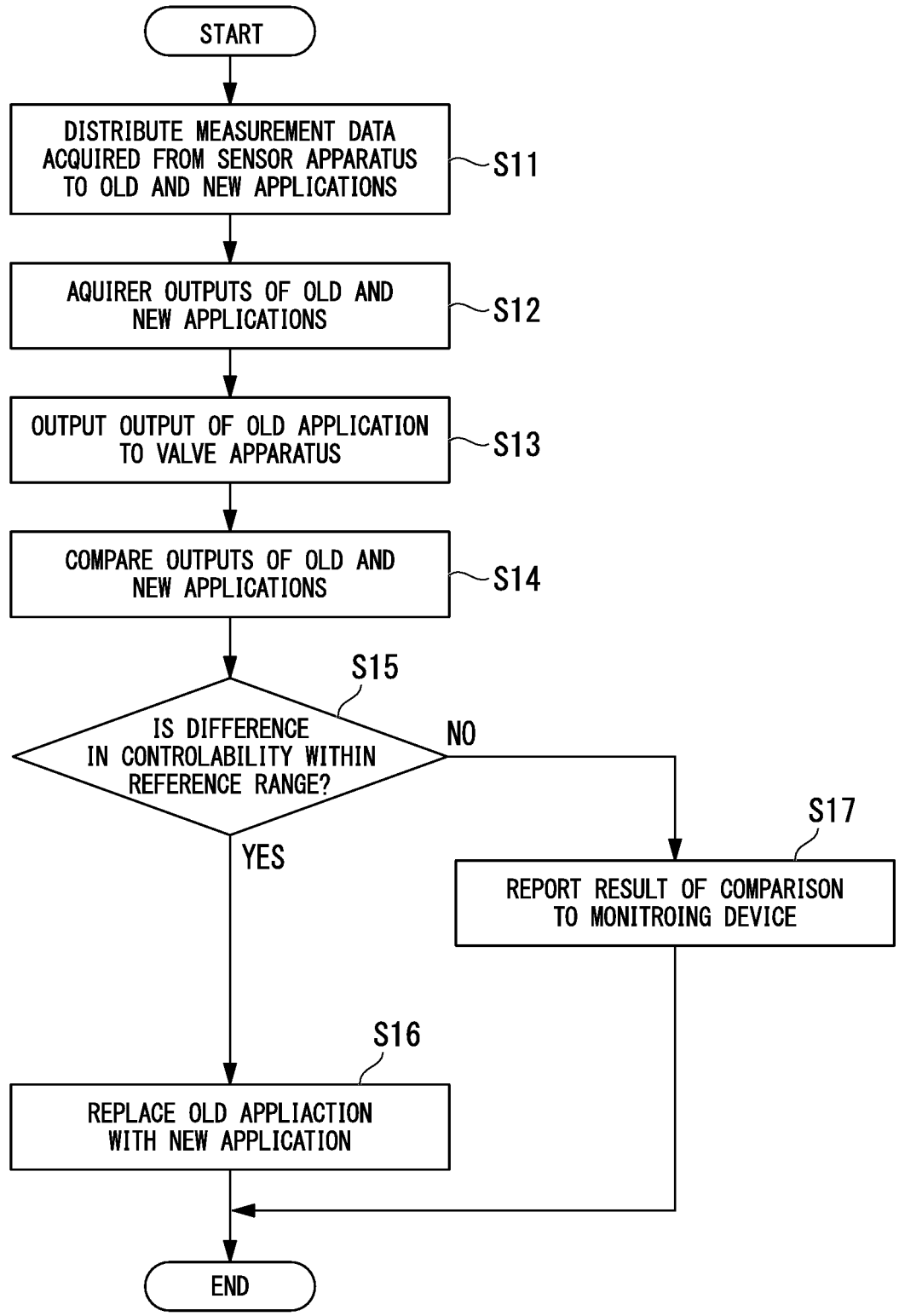
FIG. 3 is a flowchart illustrating operation of the controller according to the first embodiment of the present invention.
Figure 4A:
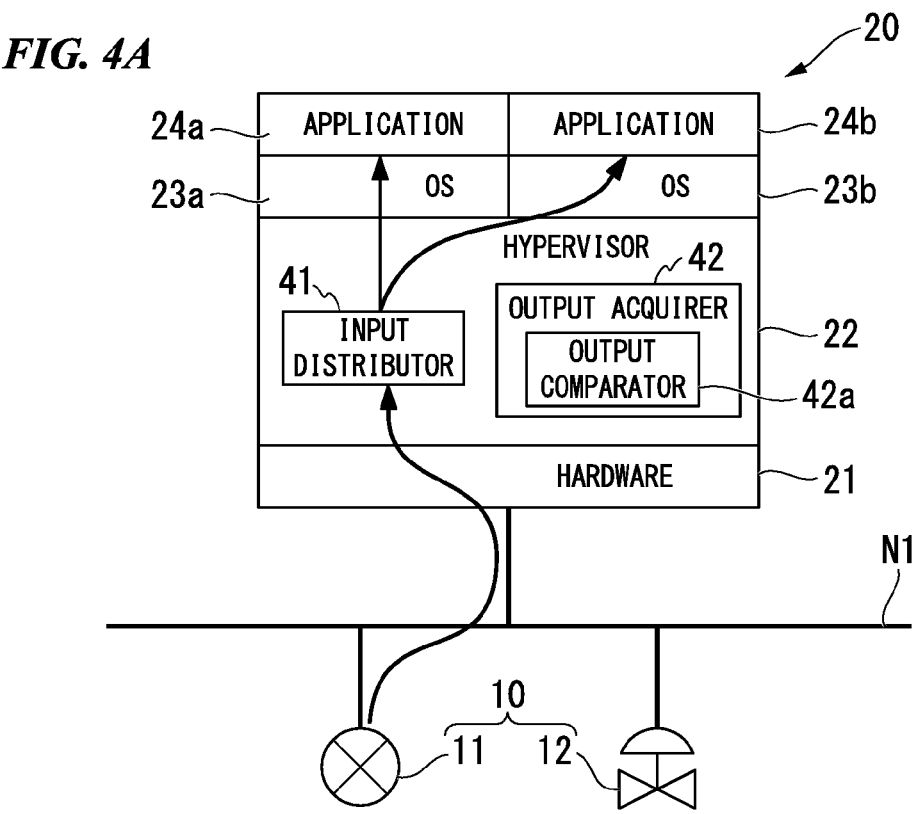
FIGS. 4A and 4B are diagrams illustrating flow of data in the controller according to the first embodiment of the present invention.
Figure 4B:
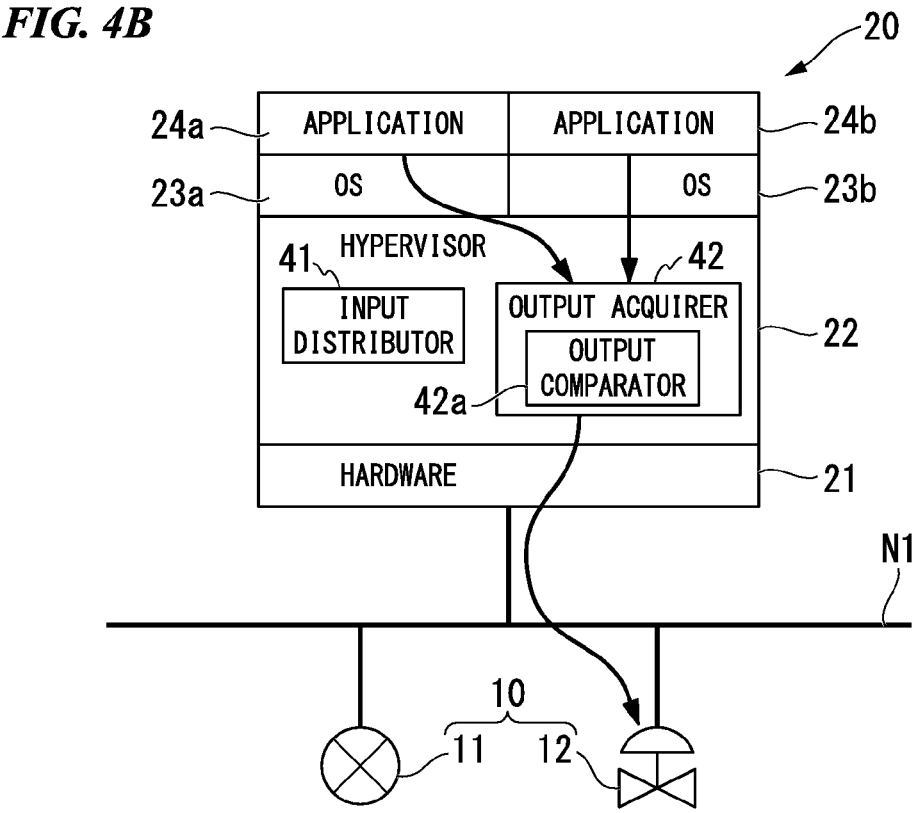

FIG. 3 is a flowchart illustrating operation of the controller according to the first embodiment of the present invention. Additionally, FIGS. 4A and 4B illustrate flow of data in the controller according to the first embodiment of the present invention. Here, the flowchart shown in FIG. 3 starts when measurement data or status data (first data) collected from the sensor apparatus 11 is input after the operator finishes the replacement work and turns on the controller 20.

When the process of the flowchart shown in FIG. 3 starts, first, a process of distributing the measurement data collected from the sensor apparatus 11 to the old and new applications (step S11). Specifically, as shown in FIG. 4A, the input distributor 41 distributes the measurement data, which is output from the sensor apparatus 11 and is input to the controller 20 via the field network N1, to the applications 24a and 24b via the operating systems 23a and 23b.

When the measurement data (first data) collected from the field apparatus 10 (first field apparatus) is input, each of the applications 24a and 24b calculates the amount of control for the valve apparatus 12 (second field apparatus) according to the input measurement data, and outputs control data indicating that amount of control (first and second signals for controlling the field apparatuses). Then, a process of acquiring outputs (first and second signals) of the old and new applications (step S12), a process of outputting the acquired output of the old application to the valve apparatus 12 (step S13), and a process of outputting the acquired output (first signal) of the old application to the valve apparatus 12 (step S13), and a process of comparing the outputs of the old and new applications (step S14) are performed sequentially.

Specifically, as shown in FIG. 4B, the acquirer 42 acquires two control data (first and second signals) respectively output from the applications 24a and 24b via the operating systems 23a and 23b. Then, the output acquirer 42 outputs to the valve apparatus 12 via the field network N1, the control data (first signal) output from the application 24a which is one of the two acquired control data. Then, the valve apparatus 12 is controlled based on the control data output from the application 24a. Additionally, the two control data output from the applications 24a and 24b, which are acquired by the output acquirer 42, are input to the output comparator 42a. Then, the output comparator 42a compares control values or output timings of the two control data.

Then, the output comparator 42a determines whether or not, as a result of the comparison in step S14, the difference in controllability between the old and new applications is within a predetermined reference value (step S15). If it is determined that the difference in controllability between the old and new applications is within a predetermined reference value (step S15: YES), the hypervisor 22 performs a process of replacing the old application with the new application (step S16).

Specifically, a process of terminating execution of the programs for implementing the operating system 23a and the application 24a (a process of terminating the first controller) is performed. By this process, as shown in FIG. 2C, the controller 20 enters a state in which only the programs for implementing the operating system 23b and the application 24b run over the hypervisor 22 of the controller 20. Here, the replacement of the old application with the new application may be performed after the operator of the monitoring device 30 gives allowance of the replacement. After the old application is replaced with the new application, the control data (second signal) output from the application 24b is output from the output acquirer 42 to the valve apparatus 12 via the field network N1. Then, the valve apparatus 12 is controlled based on the output control data.

On the other hand, if it is determined that the difference in controllability is not within the predetermined reference value (step S15: NO), a process of reporting the result of the comparison performed in step S14 to the monitoring device 30 is performed (step S17). Upon receiving the report, the operator of the monitoring device 30 refers to the reported result of the comparison, and determines whether or not to order replacement of the old application with the new application, whether or not to order replacement of the old application with the new application after changing parameters for the new application and thus improving the controllability, and the like. Here, in a case where the replacement of the old application with the new application is instructed by the operator, a similar process to that in step S16 is performed to replace the old application with the new application.

As explained above, in the first embodiment, the hypervisor 22 runs over the hardware 21 in lieu of the hardware. The distributor 41 distributes measurement data or the like output from the sensor apparatus 11, to the applications 24a and 24b that run over the hypervisor 22. The output acquire 42 acquires outputs of the applications 24a and 24b, outputs any one of the acquired outputs (the output of the application 24a) to the valve apparatus 12, and compares the acquired outputs. Thus, it is possible to easily evaluate the controllability at the time of replacing the application used by the old system (application 24a) with the application to be used by the new system (application 24b). Further, the controllability can be evaluated while the amount of control in an industrial process is controlled by the application used by the old system (application 24a), thereby enabling safer updating of the plant in a shorter time.

(Second Embodiment)

Figure 5:
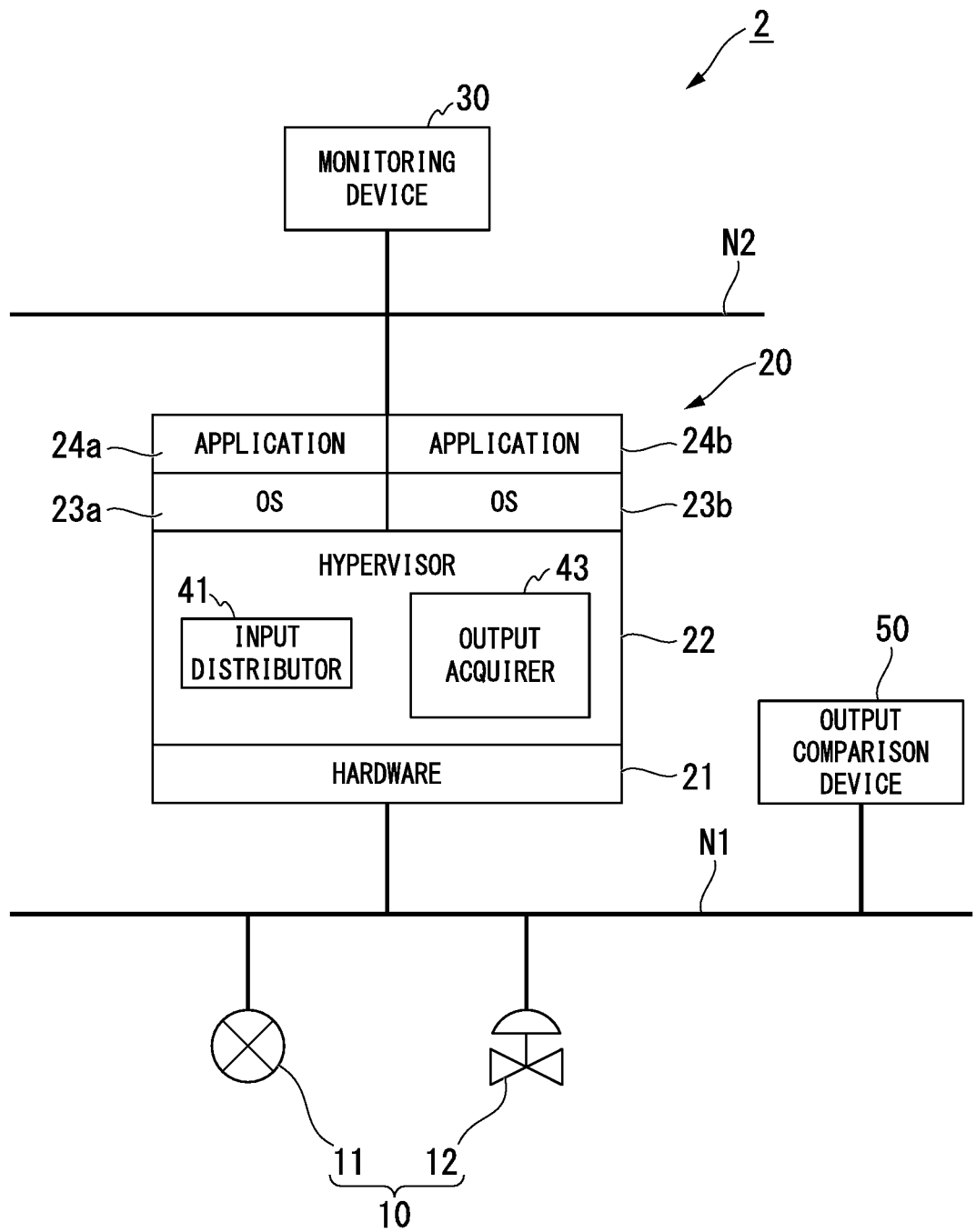
FIG. 5 is a block diagram illustrating a primary part of a process control system according to a second embodiment of the present invention.

FIG. 5 is a block diagram illustrating a configuration of a primary part of a process control system 2 according to a second embodiment of the present invention. Here, like reference numerals denote like blocks between FIGS. 1 and 5. As shown in FIG. 5, the process control system 2 of the second embodiment is configured such that comparison of two control data output from the applications 24a and 24b is performed outside the controller 20. Specifically, the process control system 2 has a configuration such that an output acquirer 43 is included in lieu of the output acquirer 42 shown in FIG. 1, and an output comparison device 50 is newly added.

Similar to the output acquirer 42 shown in FIG. 1, the output acquirer 43 acquires two control data output from the applications 24a and 24b via the operating systems 23a and 23b. Then, the output acquirer 43 outputs any one of the two acquired control data (control data output from the application 24a in this case) to the field apparatus 10 (such as the valve apparatus 12). Here, the output acquirer 43 differs from the output acquirer 42 shown in FIG. 1 in that the output acquirer 43 does not include the output comparator 42a, and transmits both the two acquired control data to the output comparison device 50.

The output comparison device 50 is connected to the field network N1, and compares the two control data transmitted from the controller 20 via the field network N1 (two control data respectively output from the applications 24a and 24b). The output comparison device 50 need not always be connected to the field network N1. For example, the output comparison device 50 is connected to the field network N1 only when the controllability at the time of replacement of the old application with the new application is evaluated. Additionally, the output comparison device 50 can be connected to the control network N1 or the field network N2.

Operation of the process control system 2 having the above configuration is similar to the operation of the process control system 1 shown in FIG. 1, except for that comparison of the two control data output from the applications 24a and 24b is performed by the output comparison device 50 provided outside the controller 20. In other words, as shown in the flowchart shown in FIG. 3, first, a process of distributing the measurement data collected from the sensor apparatus 11 to the old and new applications is performed (step S11). Thus, each of the applications 24a and 24b outputs control data according to the distributed control data.

Figure 6:
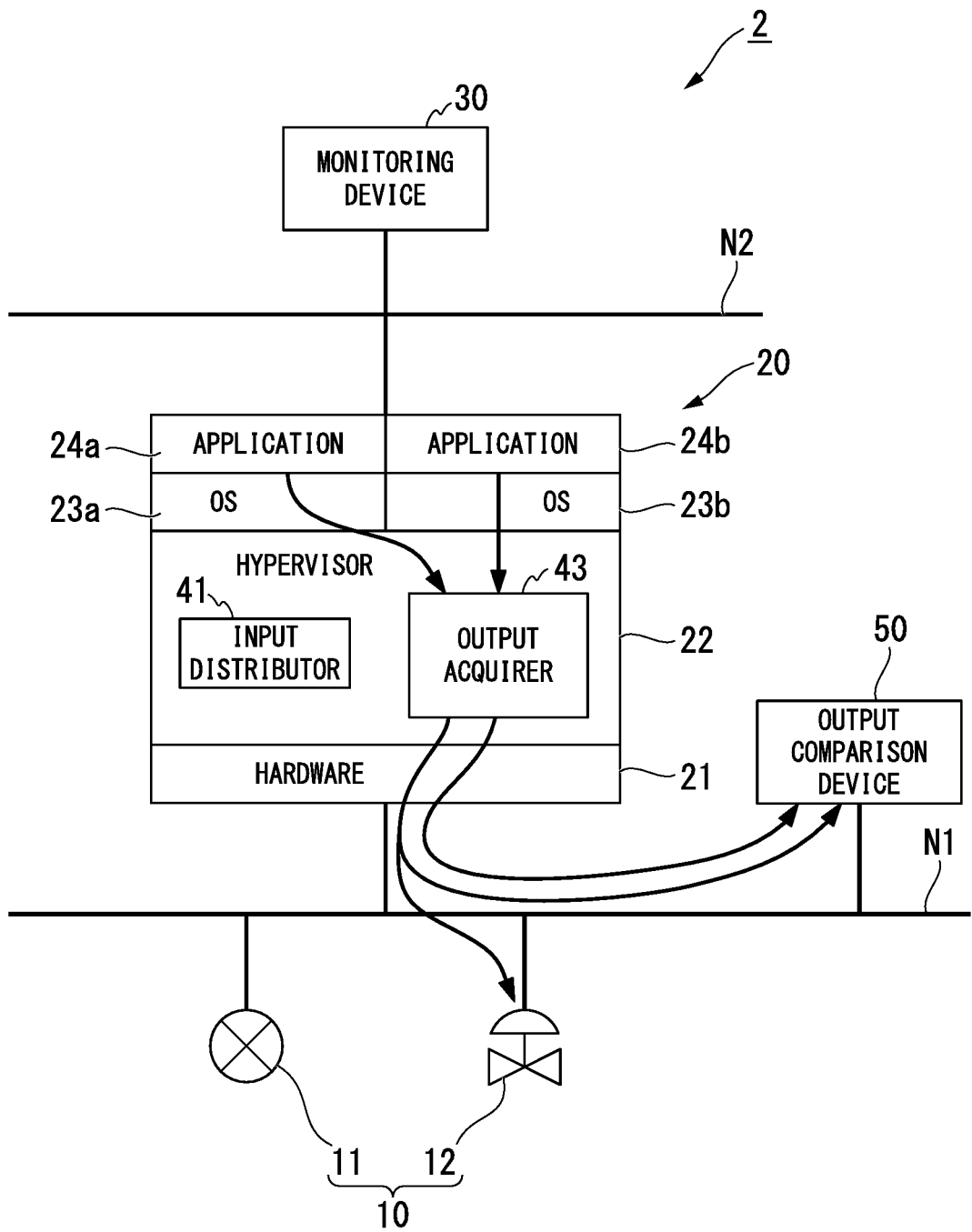
FIG. 6 is a diagram illustrating flow of data in the controller according to the second embodiment of the present invention.

Then, the process of acquiring outputs of the old and new applications (step S12), the process of outputting the acquired output of the old application to the valve apparatus 12 (step S13), and the process of comparing the outputs of the old and new applications (step S14) are performed sequentially. Specifically, as shown in FIG. 6, the acquirer 43 acquires two control data respectively output from the applications 24a and 24b via the operating systems 23a and 23b. Then, the output acquirer 43 outputs to the valve apparatus 12 via the field network N1, the control data output from the application 24a which is one of the two acquired control data. Additionally, the two control data respectively output from the applications 24a and 24b, which are acquired by the output acquirer 42, are transmitted to the output comparison device 50 via the field network N1. Then, the output comparison device 50 compares control values or output timings of the two control data. FIG. 6 is a diagram illustrating flow of data in the controller according to the second embodiment of the present invention.

After the above process, the output comparison device 50 determines whether or not the difference in controllability between the old and new applications (difference in the control value or the output timing of the control data) is within a predetermined reference value (step S15). If it is determined that the difference in controllability between the old and new applications is within the predetermined reference value (step S15: YES), the hypervisor 22 performs a process of replacing the old application with the new application (step S16). Conversely, if it is determined that the difference in controllability between the old and new applications is not within the predetermined reference value (step S15: NO), a process of reporting a result of the comparison performed in step S14 to the monitoring device 30 via a gateway (not shown) that connects the networks N1 and N2 (step S17).

As explained above, the second embodiment differs from the first embodiment in that the comparison of the outputs of the applications 24a and 24b is performed by the output comparison device 50 provided outside the controller 20. Similar to the first embodiment, however, the hypervisor 22 runs over the hardware 21, the input distributor 41 distributes the measurement data or the like, the output acquirer 43 acquires the outputs of the applications 24a and 24b, and the like. For this reason, it is possible to easily evaluate the controllability at the time of replacing the application used by the old system (application 24a) with the application to be used by the new system (application 24b). Further, the controllability can be evaluated while the amount of control in an industrial process is controlled by the application used by the old system (application 24a), thereby enabling safer updating of the plant in a shorter time.

(Applications)

Hereinafter, applications of the process control systems of the above first and second embodiments are explained. In the above first and second embodiments, as shown in FIG. 2B, the controller 22 has the configuration that the hypervisor 22 runs, and two applications 24a and 24b run over the hypervisor 22, thereby enabling the existing controller 100 (see FIG. 2A) to be replaced with the new controller 20 (see FIG. 2C). In the present applications, on the other hand, a configuration is made such that the hypervisor 22 runs, and three or more applications can run over the hypervisor 22, thereby enabling multiple existing controllers to be replaced with one new controller.

(First Application)

FIGS. 7A to 7C are diagrams illustrating a first application of the process control systems of the first and second embodiments of the present invention. As shown in FIGS. 7A to 7C, in the present application, a controller 20, in which the hypervisor 22 runs, and four applications (old AP1 to old AP3, and new AP) can run over the hypervisor 22, is used, thereby replacing three existing controllers 111 to 113 with one new controller 20. Here, for an explanatory purpose, an application is denoted as "AP" in FIGS. 7A to 7C. Additionally, the output acquirer 42, 43 shown in FIGS. 7A to 7C denote the output acquirer 42 shown in FIG. 1 or the output acquirer 43 shown in FIG. 5.

The existing controllers 111 to 113 are controllers in which one operating system and one application run over the hardware. Specifically, as shown in FIG. 7A, the controller 111 has a configuration such that the operating system (old OS1) and the application (old AP1) run. The controller 112 has a configuration such that the operating system (old OS2) and the application (old AP2) run. The controller 113 has a configuration such that the operating system (old OS3) and the application (old AP3) run.

The three existing controllers 111 to 113 are removed from the field network N1, and the new controller 20 is connected to the field network N1. Here, the new controller 20 is a controller in which a program for implementing the hypervisor 22, programs for implementing the operating systems (old OS1 to old OS3, and new OS), and programs for implementing the applications (old AP1 to old AP3, and new AP) have been installed.

When the controller 20 is powered on after the above replacement, the installed programs run, and thus the hypervisor 22, the operating systems (old OS1 to old OS3, and new OS), and the applications (old AP1 to old AP3, and new AP) run over the hardware 21, as shown in FIG. 7B. Here, the input distributor 41 in the hypervisor 22 distributes to the applications (old AP1 to old AP3, and new AP), measurement data and status data which are collected from the sensor apparatus 11. Additionally, the output acquirer 42 or 43 in the hypervisor 22 acquires outputs of the applications (old AP1 to old AP3, and new AP), and outputs to the valve apparatus 12, the acquired outputs of the applications (old AP1 to old AP3).

In the state shown in FIG. 7B, the outputs of the applications (old AP1 to old AP3) and the output of the application (new AP) are compared, thereby making it possible to evaluate the controllability at the time of the replacement. Then, the programs for implementing the operating systems (old OS1 to old OS3) and the applications (old AP1 to old AP3) are terminated. Thus, the controller 20 enters a state in which only the programs for implementing the operating system (new OS) and the application (new AP) run over the hypervisor 22 of the controller 20 (see FIG. 7C).

(Second Application)

FIGS. 8A to 8C are diagrams illustrating a second application of the process control systems of the first and second embodiments of the present invention. As shown in FIGS. 8A to 8C, in the present application, a controller 20a in which the hypervisor 22 runs, and four applications (old AP1 to old AP3, and new AP11) can run over the hypervisor 22, and a controller 20b (first process control device) in which three applications (old AP4, old AP5, and new AP12) can run over the hypervisor 22, are used, thereby replacing five existing controllers 121 to 125 (controllers 124 and 125 correspond to second and third process control devices) with two new controllers 20a and 20b. Here, for an explanatory purpose, an application is denoted as "AP" in FIGS. 8A to 8C. Additionally, the output acquirer 42, 43 shown in FIGS. 8A to 8C denote the output acquirer 42 shown in FIG. 1 or the output acquirer 43 shown in FIG. 5.

The existing controllers 121 to 125 are controllers in which one operating system and one application run over the hardware. Specifically, as shown in FIG. 8A, the controller 121 has a configuration such that the operating system (old OS1) and the application (old AP1) run. The controller 122 has a configuration such that the operating system (old OS2) and the application (old AP2) run. The controller 123 has a configuration such that the operating system (old OS3) and the application (old AP3) run. The controller 124 has a configuration such that the operating system (old OS4) and the application (old AP4) (first controller) run. The controller 125 has a configuration such that the operating system (old OS5) and the application (old AP5) (second controller) run.

The five existing controllers 121 to 125 (controllers 124 and 125 respectively correspond to second and third process control devices) are removed from the field network N1, and the new controllers 20a and 20b are connected to the field network N1. Here, the new controller 20a is a controller in which a program for implementing the hypervisor 22, programs for implementing the operating systems (old OS1 to old OS3, and new OS11), and programs for implementing the applications (old AP1 to old AP3, and new AP11) have been installed. Additionally, the new controller 20b (first process control device) is a controller in which a program for implementing the hypervisor 22, programs for implementing the operating systems (old OS4, old OS5, and new OS12), and programs for implementing the applications (old AP4, old AP5, and new AP12) have been installed. Thus, the controller 20b enters a state in which a first software executed by the existing controller 124 (the operating system (old OS4) and the application (old AP4)) is installed in the first controller, a second software executed by the existing controller 125 (the operating system (old OS5) and the application (old AP5)) is installed in the second controller, and a third software that is newer in version than the first and second softwares is installed in the third controller, and the first to third softwares are independently executed.

When the controllers 20a and 20b are powered on after the above replacement, the installed programs are executed. In other words, in the controller 20a, the hypervisor 22, the operating systems (old OS1 to old OS3, and new OS11), and the applications (old AP1 to old AP3, and new AP11) run over the hardware 21, as shown in FIG. 8B. Additionally, in the controller 20b, the hypervisor 22, the operating systems (old OS4, old OS5, and new OS12), and the applications (old AP4, old AP5, and new AP12) run over the hardware 21.

Here, the input distributor 41 in the hypervisor 22 that runs in the controller 20a distributes to the applications (old AP1 to old AP3, and new AP11), measurement data and status data which are collected from the sensor apparatus 11. Additionally, the output acquirer 42 or 43 in the hypervisor 22 acquires outputs of the applications (old AP1 to old AP3, and new AP11), and outputs to the valve apparatus 12, the outputs of the applications (old AP1 to old AP3) which are of the acquired outputs.

Similarly, the input distributor 41 in the hypervisor 22 that run in the controller 20b distributes to the applications (old AP1, old AP5, and new AP12), measurement data and status data which are collected from the sensor apparatus 11. Additionally, the output acquirer 42 or 43 in the hypervisor 22 acquires outputs of the applications (old AP4, old AP5, and new AP12), and outputs to the valve apparatus 12, the outputs of the applications (old AP4 and old AP5) which are of the acquired outputs.

In the state shown in FIG. 8B, the outputs of the applications (old AP1 to old AP3) and the output of the application (new AP11) in the controller 20a are compared. Additionally, the outputs (first and second signals) of the applications (old AP4 and old AP5) and the output (third signal) of the application (new AP12) in the controller 20b are compared. Thus, it is possible to evaluate the controllability at the time of the replacement. More specifically, the difference (first difference) in controllability between the output (first signal) of the old application (old AP4) and the output (third signal) of the new application (new AP12) is within a predetermined reference value. If the difference (first difference) in controllability is within a predetermined reference value, a process of replacing the old application (old AP4) with the new application (new AP12) (process of terminating the first controller) is performed. Similarly, the difference (second difference) in controllability between the output (second signal) of the old application (old AP4) and the output (third signal) of the new application (new AP12) is within the predetermined reference value. If the difference (second difference) in controllability is within the predetermined reference value, a process of replacing the old application (old AP5) with the new application (new AP12) (process of terminating the second controller) is performed.

Then, the programs for implementing the operating systems (old OS1 to old OS3) and the applications (old AP1 to old AP3) are terminated in the controller 20a. Thus, the controller 20a enters a state in which only the programs for implementing the operating system (new OS11) and the application (new AP11) run over the hypervisor 22 of the controller 20a. Additionally, the programs for implementing the operating systems (old OS4 and old OS5) and the applications (old AP4 and old AP5) are terminated in the controller 20b. Thus, the controller 20b enters a state in which only the programs for implementing the operating system (new OS12) and the application (new AP12) run over the hypervisor 22 of the controller 20b (see FIG. 8C).

Although the process control systems according to the embodiments of the present invention have been explained, the present invention is not limited thereto, and various modifications may be made without departing from the scope of the present invention. For example, explanation has been given in the above embodiments with respect to the case where virtual environments that enable multiple operating systems and applications to run are implemented in each of the controllers 20, 20a, and 20b by the hypervisor 22. However, a means for implementing such virtual environments is not limited to the hyper visor 22. For example, the above virtual environments may be implemented by hardware.

Additionally, explanation has been given in the first and second embodiments and the applications thereof with respect to the case where replacement of the controller is performed off-line (with the process control system being temporarily terminated). However, replacement of the controller may be performed on-line (without terminating the process control system). Specifically, a new controller is connected to the field network N1 while an existing controller is connected to the field network N1. Then, the new controller is powered on to run, and then the existing controller is removed from the field network N1. Thus, it is possible to perform the replacement without terminating the plant control system.

Additionally, even in a case where redundant controllers are provided, it is possible to replace the redundant controllers on-line. Specifically, a new controller is connected to the field network N1 to run while the existing redundant controllers (a controlling controller and an idle controller) are connected to the field controllers. Then, the idle controller is removed from the field network N1. Then, another new controller is connected to the field network N1 to run, and the controlling controller transfers control to one of the new controllers. Then, the controlling controller is removed from the field network N1. Thus, even in a case where the redundant controllers are provided, it is possible to perform replacement without terminating the plant control system.

Further, explanation has been given in the above embodiments with respect to the cases where the field apparatus 10 can perform digital communication via the field network N1. However, a field apparatus 10 that inputs and outputs analog signals may be used. In a case where such a field apparatus is used, an I0 node is connected to the field network N1. The I0 node converts between signals input to or output from the field apparatus (analog signals), and the signals transferred by communication via the field network N1 (digital signals). Then, the I0 node and the field apparatus are connected by an analog transmission path (such as a transmission line used for transmitting signals of "4 mA to 20 mA").

Moreover, the first and second embodiments may be combined to make a configuration such that the controller including the output comparator 42a shown in FIG. 1 and the output comparison device 50 shown in FIG. 5 are connected to the field network N1. In such a configuration, which of the output comparator 42a and the output comparison device 50 is to perform comparison can be selected, thereby achieving flexible application according to the configuration of the system.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

It is apparent that the present invention is not limited to the above embodiments, and may be modified and changed without departing from the scope and spirit of the invention.

What is claimed is:

1. A single controller comprising:
a memory storing a virtualizer software, a first software, a second software, and a third software, the first software having a first operating system and a first application software, the second software having a second operating system and a second application software, the third software having a third operating system and a third application software, at least one of the second operating system and the second application software being different from a corresponding one of the first operating system and the first application software, the first software having been used to control a first field apparatus connected to the single controller, the second software having not yet been used to control the first field apparatus, and the third application software having the same function as the first application software; and a processor configured to install, in the single controller, the virtualizer software, the first software, and the second software, and to execute, upon receiving a first signal of measurement data from a second field apparatus, the virtualizer software, while controlling an industrial process implemented in a plant, to perform at least:

a) acquiring the first signal output from the second field apparatus;
b) distributing the first signal to the first software in the single controller;
c) distributing the first signal to the second software in the single controller;
d) executing the first software in the single controller to have the first software process the first signal to generate a second signal;
e) executing the second software in the single controller to have the second software process the first signal to generate a third signal;
f) executing the third software in the single controller to have the third software process the first signal to generate a fourth signal;
g) comparing the second signal and the third signal in the single controller to determine a difference in controllability to the first field apparatus between the first software and the second software;
h) comparing the second signal and the fourth signal in the single controller to determine a difference in controllability to the first field apparatus between the first software and the third software;
i) determining whether or not the first software is replaceable by the second software based on the difference in controllability to the first field apparatus;
j) determining whether or not the first software is replaceable by the third software based on the difference in controllability to the second field apparatus;
k) replacing the first software by the second software in a case that the first software is replaceable by the second software;
l) replacing the first software by the third software in a case that the first software is replaceable by the third software;
m) generating a fifth signal indicating the difference in controllability to the first field apparatus in a case that the first software is not replaceable by the second software, and
n) generating a sixth signal indicating the difference in controllability to the second field apparatus in a case that the first software is not replaceable by the third software.

2. A single controller comprising:
a memory storing a virtualizer software, a first software, a second software, and a third software, the first software having a first operating system and a first application software, the second software having a second operating system and a second application software, the third software having a third operating system and a third application software, at least one of the second operating system and the second application software being different from a corresponding one of the first operating system and the first application software, the first software having been used to control a first field apparatus connected to the single controller, the second software having not yet been used to control the first field apparatus, and the third application software having the same function as the first application software; and a processor configured to install, in the single controller, the virtualizer software, the first software, and the second software, and to execute, upon receiving a first signal of measurement data from a second field apparatus, the virtualizer software, while controlling an industrial process implemented in a plant, to perform at least:

a) acquiring the first signal output from the second field apparatus;
b) distributing the first signal to the first software in the single controller;
c) distributing the first signal to the second software in the single controller;

d) executing the first software in the single controller to have the first software process the first signal to generate a second signal; and
e) executing the second software in the single controller to have the second software process the first signal to generate a third signal;
f) executing the third software in the single controller to have the third software process the first signal to generate a fourth signal;
g) sending the second signal and the third signal to a first device configured to compare the second signal and the third signal, determine a difference in controllability to the first field apparatus between the first software and the second software; and determine whether or not the first software is replaceable by the second software based on the difference in controllability to the first field apparatus;
h) sending the second signal and the fourth signal to a second device configured to compare the second signal and the fourth signal, determine a difference in controllability to the second field apparatus between the first software and the third software; and determine whether or not the first software is replaceable by the third software based on the difference in controllability to the second field apparatus;
i) receiving, from the first device, a first result of determination on whether or not the first software is replaceable by the second software;
j) receiving, from the second device, a second result of determination on whether or not the first software is replaceable by the third software;
k) replacing the first software by the second software in a case that the first software is replaceable by the second software;
l) replacing the first software by the third software in a case that the first software is replaceable by the third software;
m) generating a fifth signal indicating the difference in controllability to the first field apparatus in a case that the first software is not replaceable by the second software; and
n) generating a sixth signal indicating the difference in controllability to the first field apparatus in a case that the first software is not replaceable by the third software.

3. A method comprising:
installing, in a single controller, a virtualizer software, a first software, a second software, and a third software, the first software having a first operating system and a first application software, the second software having a second operating system and a second application software, the third software having a third operating system and a third application software, at least one of the second operating system and the second application software being different from a corresponding one of the first operating system and the first application software, the first software having been used to control a first field apparatus connected to the single controller, the second software having not yet been used to control the first field apparatus, and the third application software having the same function as the first application software;
executing, by the single controller upon receiving a first signal of measurement data from a second field apparatus, the virtualizer software while controlling an industrial process implemented in a plant, to perform at least:

a) acquiring the first signal output from the second field apparatus;
b) distributing the first signal to the first software in the single controller;
c) distributing the first signal to the second software in the single controller;
d) executing the first software in the single controller to have the first software process the first signal to generate a second signal;
e) executing the second software in the single controller to have the second software process the first signal to generate a third signal;
f) executing the third software in the single controller to have the third software process the first signal to generate a fourth signal;
g) comparing the second signal and the third signal in the single controller to determine a difference in controllability to the first field apparatus between the first software and the second software;
h) comparing the second signal and the fourth signal in the single controller to determine a difference in controllability to the first field apparatus between the first software and the third software;
i) determining whether or not the first software is replaceable by the second software based on the difference in controllability to the first field apparatus;
j) determining whether or not the first software is replaceable by the third software based on the difference in controllability to the second field apparatus;
k) replacing the first software by the second software in a case that the first software is replaceable by the second software;
l) replacing the first software by the third software in a case that the first software is replaceable by the third software;
m) generating a fourth signal indicating the difference in controllability to the first field apparatus in a case that the first software is not replaceable by the second software; and
n) generating a sixth signal indicating the difference in controllability to the second field apparatus in a case that the first software is not replaceable by the third software.

4. A method comprising:
installing, in a single controller, a virtualizer software, a first software, a second software, and a third software, the first software having a first operating system and a first application software, the second software having a second operating system and a second application software, the third software having a third operating system and a third application software, the second operating system being different from the first operating system, the second application software being different from the first application software, the first software having been used to control a first field apparatus connected to the single controller, the second software having not yet been used to control the first field apparatus, and the third application software having the same function as the first application software;
executing, by the single controller upon receiving a first signal of measurement data from a second field apparatus, the virtualizer software while controlling an industrial process implemented in a plant, to perform at least:

a) acquiring the first signal output from the second field apparatus;
b) distributing the first signal to the first software in the single controller;
c) distributing the first signal to the second software in the single controller;
d) executing the first software in the single controller to have the first software process the first signal to generate a second signal;
e) executing the second software in the single controller to have the second software process the first signal to generate a third signal;
f) executing the third software in the single controller to have the third software process the first signal to generate a fourth signal;
g) sending the second signal and the third signal to a device configured to compare the second signal and the third signal, to determine a difference in controllability to the first field apparatus between the first software and the second software; and to determine whether or not the first software is replaceable by the second software based on the difference in controllability to the first field apparatus;
h) sending the second signal and the fourth signal to a second device configured to compare the second signal and the fourth signal, determine a difference in controllability to the second field apparatus between the first software and the third software; and determine whether or not the first software is replaceable by the third software based on the difference in controllability to the second field apparatus;
i) receiving, from the first device, a first result of determination on whether or not the first software is replaceable by the second software;
j) receiving, from the second device, a second result of determination on whether or not the first software is replaceable by the third software;
k) replacing the first software by the second software in a case that the first software is replaceable by the second software;
l) replacing the first software by the third software in a case that the first software is replaceable by the third software;
m) generating a fifth signal indicating the difference in controllability to the first field apparatus in a case that the first software is not replaceable by the second software; and
n) generating a sixth signal indicating the difference in controllability to the first field apparatus in a case that the first software is not replaceable by the third software.

\* \* \* \* \*